United States Patent [19]

Olsson

[11] 3,722,365
[45] Mar. 27, 1973

[54] HYDRAULIC PRESSURE APPARATUS

[75] Inventor: Sven O. Olsson, Edina, Minn.

[73] Assignee: Essar Corporation, Minneapolis, Minn.

[22] Filed: Feb. 14, 1972

[21] Appl. No.: 225,842

Related U.S. Application Data

[62] Division of Ser. No. 96,024, Dec. 8, 1970, Pat. No. 3,662,142, which is a division of Ser. No. 819,006, April 24, 1969, Pat. No. 3,604,884.

[52] U.S. Cl.................91/4 A, 91/1, 91/445, 91/453, 91/459
[51] Int. Cl......F15b 21/04, F01b 25/26, F01b 31/12
[58] Field of Search........91/4 A, 4 R, 171, 446, 459, 91/453, 1, 445

[56] References Cited

UNITED STATES PATENTS

| | | | |
|---|---|---|---|
| 3,124,371 | 3/1964 | Weir | 91/4 |
| 3,355,993 | 12/1967 | Williamson | 91/171 |

FOREIGN PATENTS OR APPLICATIONS

| | | | |
|---|---|---|---|
| 720,370 | 5/1942 | Germany | 91/4 A |

*Primary Examiner*—Paul E. Maslousky
*Attorney*—L. Paul Burd et al.

[57] ABSTRACT

An electrical discharge machining device or EDM machine having a head carrying an electrode which is movable toward and away from a work piece by a hydraulically operated double acting cylinder. A control valve, combined with a servo solenoid and manually operated lever, is operable to control the flow of hydraulic fluid to the cylinder. A light responsive electrical control operates the servo solenoid in response to the size of the electrical discharge gap between the electrode and the work piece. Interposed in the fluid line to the hydraulic cylinder is a lock valve operable to lock the cylinder and fix the position of the electrode relative to the work piece. The manually controlled lever is operable to engage switches to override the lock valve control during the electrical machining and elevation of the electrode operations of the device. Hydraulic pressure is continuously supplied to the control valve from a pair of liquid storing chambers connected to the control valve with a switching valve. Fluid under pressure in either one of the chambers operates a switching valve to provide a continuous source of hydraulic fluid under pressure to the control valve. The head contains the hydraulic pressure source, control valve, EDM power supply, electric control circuit for the valve and the double acting cylinder.

10 Claims, 6 Drawing Figures

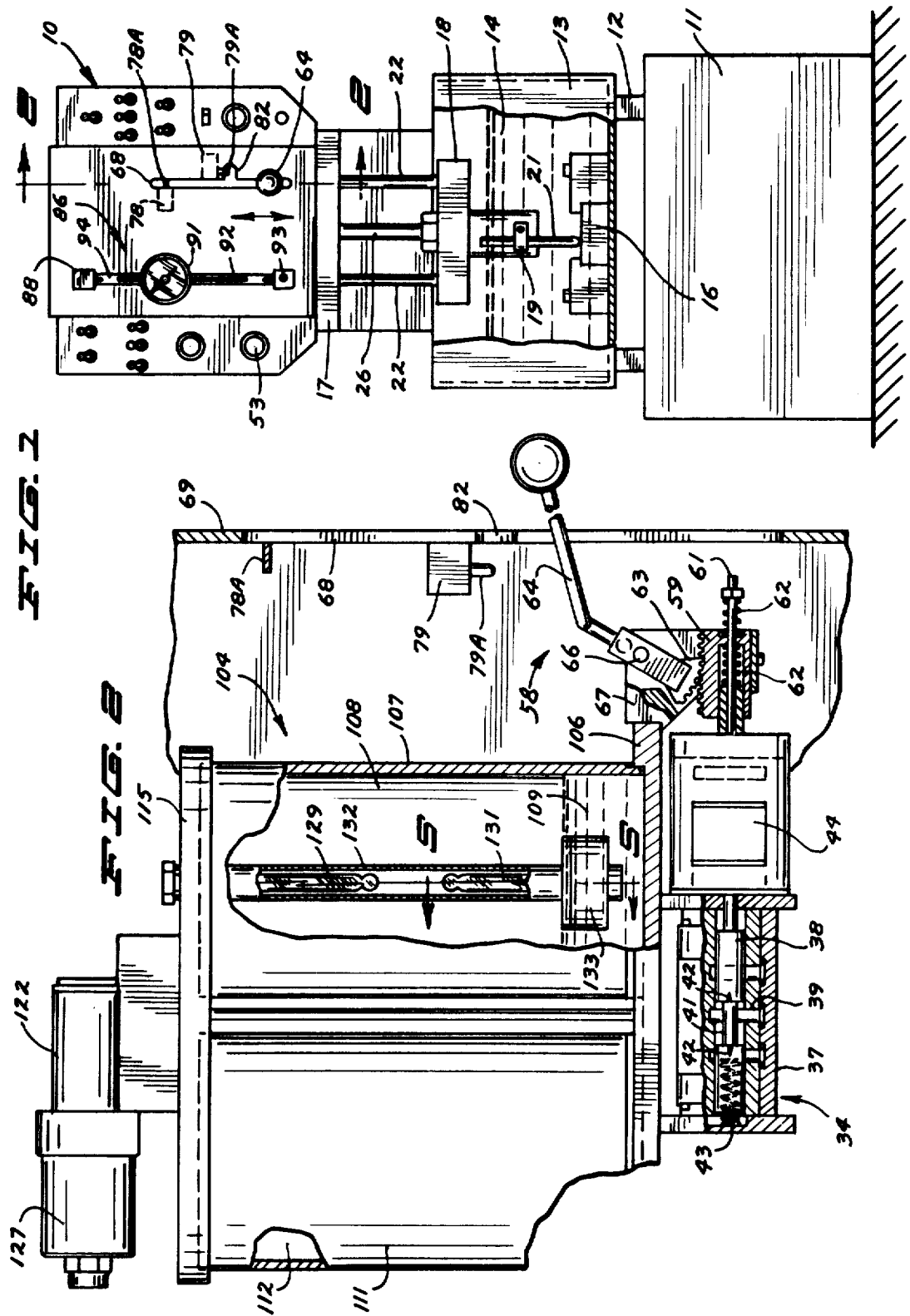

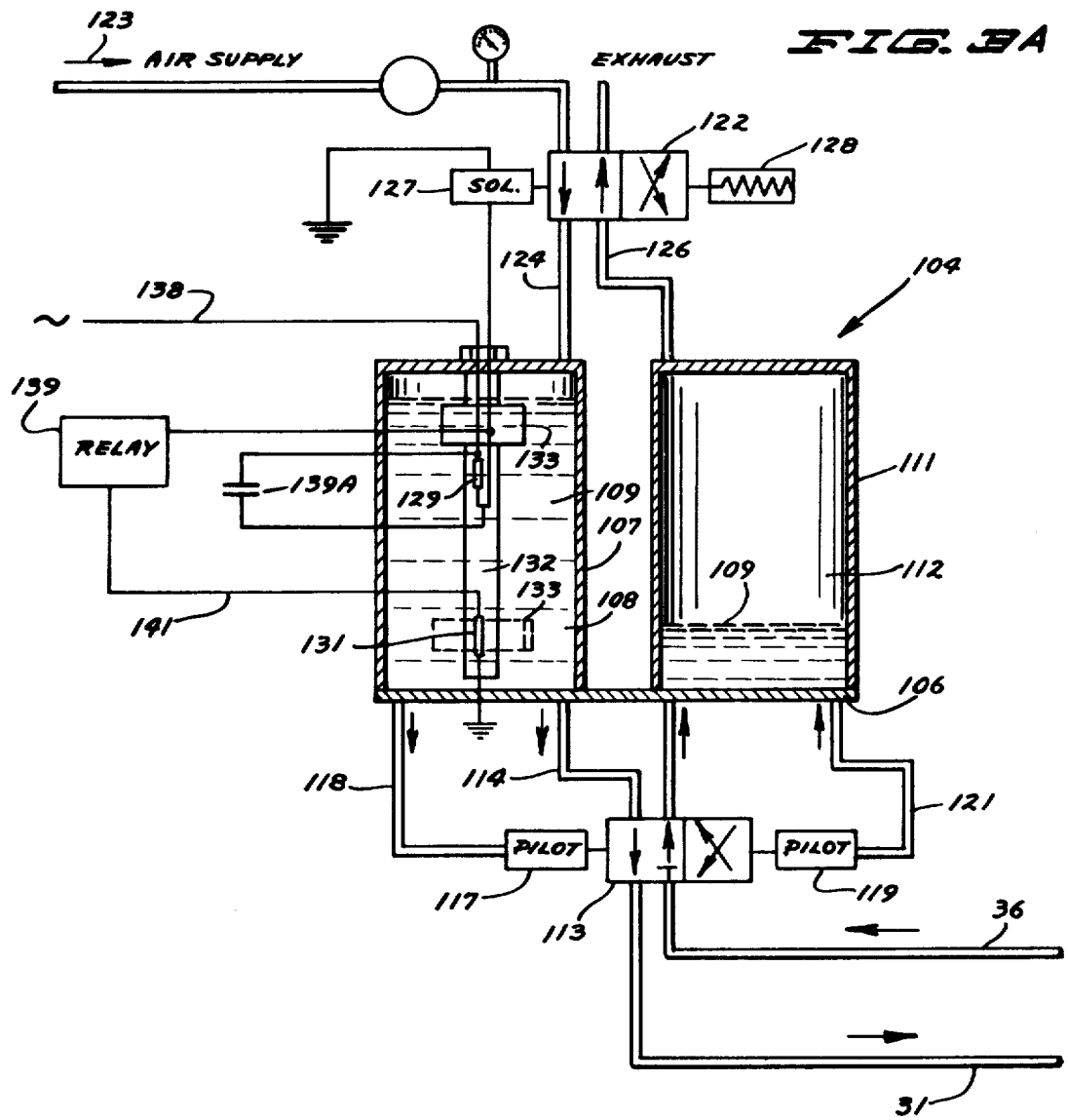

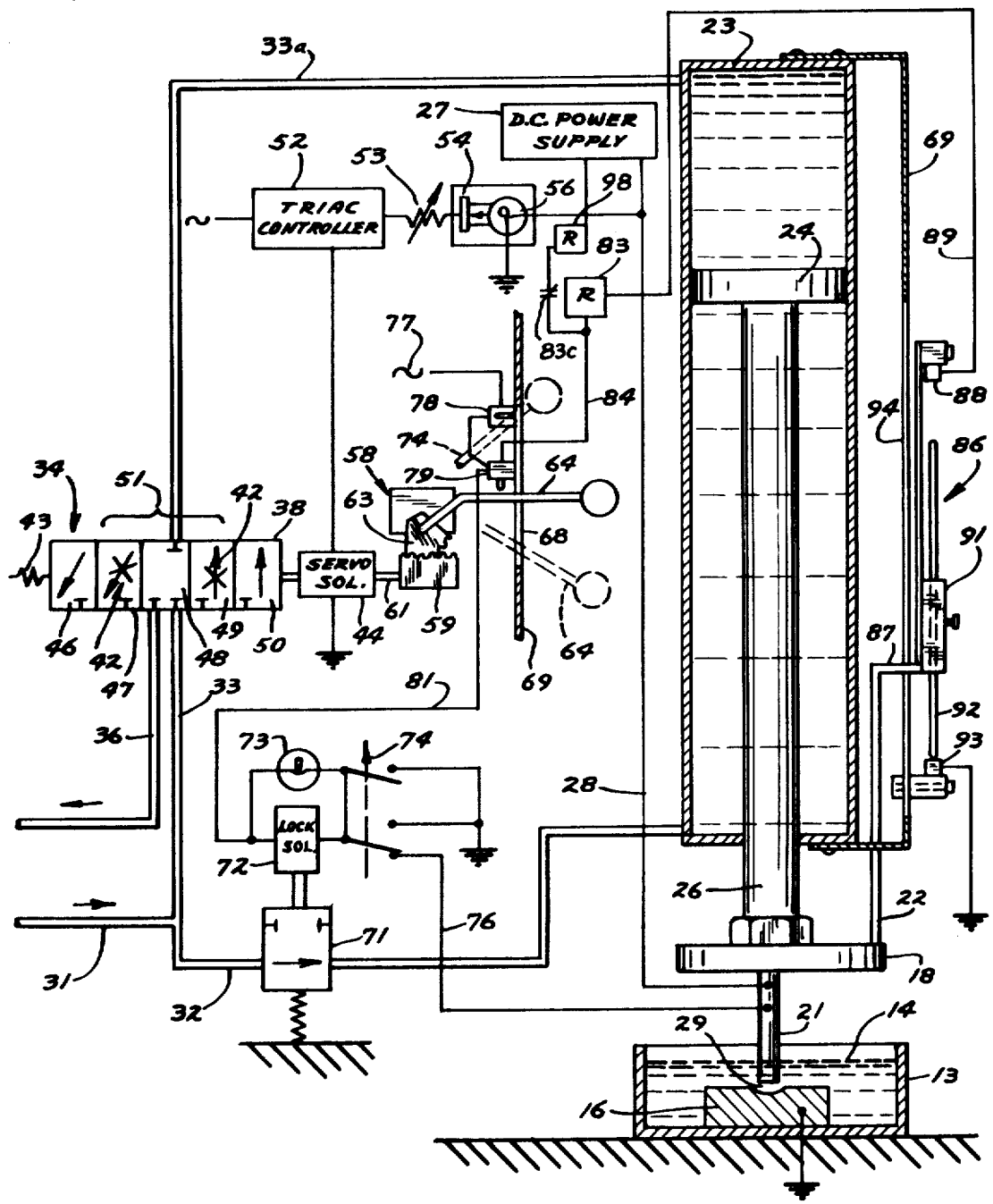

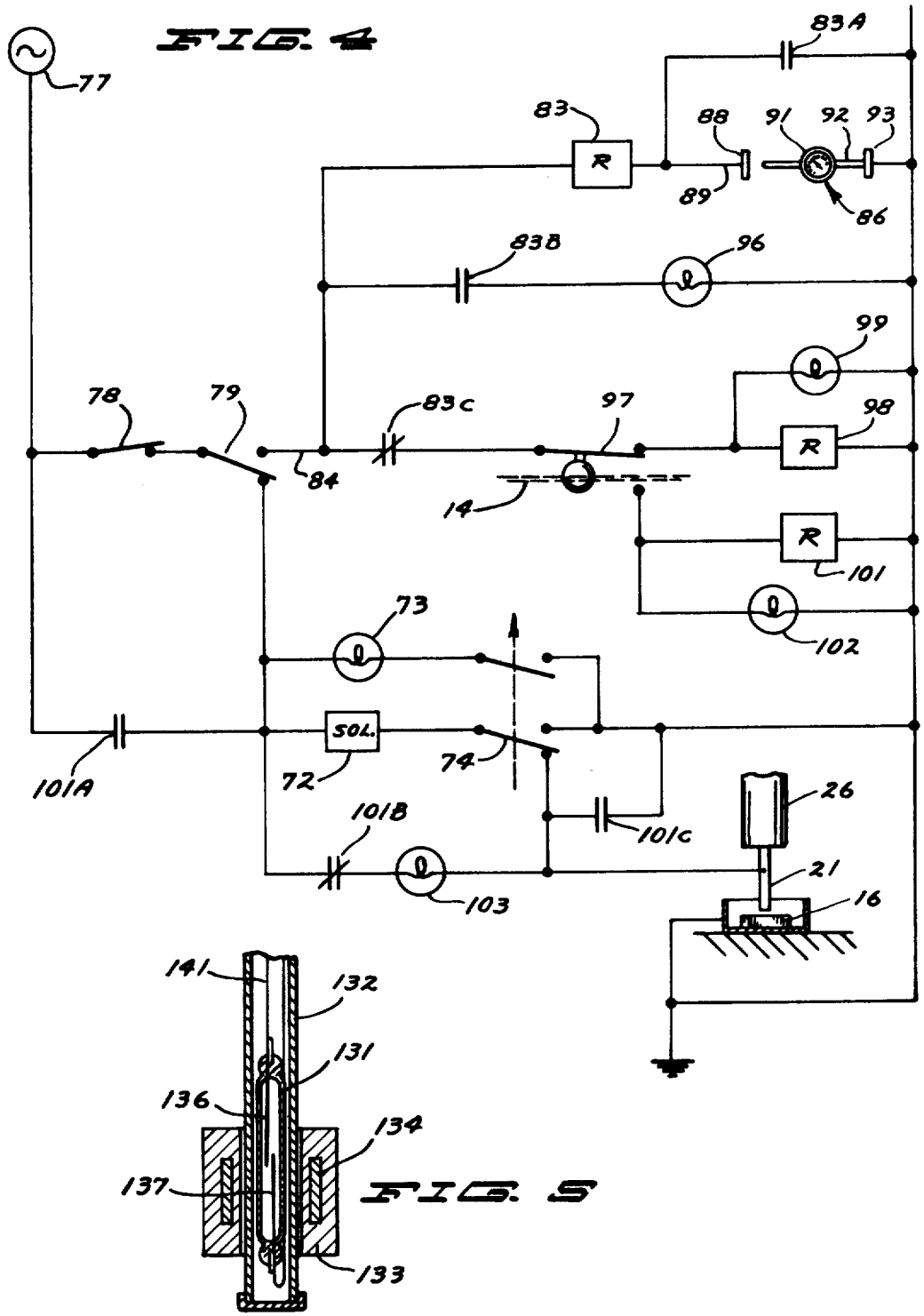

HYDRAULIC PRESSURE APPARATUS

CROSS REFERENCE TO RELATED APPLICATION:

This application is a division of U. S. Application Ser. No. 96,024 filed Dec. 8, 1970. U. S. application Ser. No. 96,024 now U. S. Pat. No. 3,662,142, is a division of U. S. application No. 819,006 filed Apr. 24, 1969, now U. S. Pat. No. 3,604,884.

SUMMARY OF THE INVENTION:

The invention relates to an apparatus for supplying a continuous source of hydraulic fluid pressure into the hydraulic system of an electrical discharge machining device or other devices using hydraulic fluid under pressure. This apparatus has a pair of hydraulic storing chambers selectively subjected to fluid under pressure, as air under pressure. A first control operable in response to the level of hydraulic fluid, as oil and other liquids, in one chamber supplies the fluid under pressure selectively to the first chamber and the second chamber. A hydraulic fluid control valve is operable to selectively exhaust and return hydraulic fluid to the chambers. The hydraulic fluid valve is controlled in response to the pressures of the hydraulic fluid in the chambers so that hydraulic fluid flows out of one chamber into the hydraulic system and back into the opposite chamber.

IN THE DRAWINGS:

FIG. 1 is a front elevational view of an EDM machine equipped with the control system of the invention with part of the dielectric liquid tank broken away to show the electrode and work piece;

FIG. 2 is an enlarged sectional view taken along line 2—2 of FIG. 1;

FIG. 3A is a diagrammatic view of the constant fluid pressure system to supply fluid under pressure to the electrode control cylinder;

FIG. 3B is a diagrammatic view of the electric and fluid control system of the invention;

FIG. 4 is an electrical diagram of the automatic depth control and dielectric liquid level control; and FIG. 5 is a sectional view taken along line 5—5 of FIG. 2.

Referring to the drawing, there is shown in FIG. 1 an electrical discharge machining device, indicated generally at 10, having a base 11 carrying a movable work table 12. A tank 13 containing a dielectric liquid 14, as kerosene or EDM oils, is supported on the table 12 for movement in the X and Y directions by crank structures (not shown). Secured to the base of tank 13 is a work piece 16 of a conductive material, as metal.

Extended over tank 13 is a machine head or upper frame 17 carrying the controls and hydraulic and electrical systems. Mounted on the head 17 is a movable block 18 carrying a downwardly directed support 19. An elongated upright electrode 21 is secured to support 19. The end of the electrode extends below the support toward the work piece 16. A pair of upright guide rods 22 secured to the movable block 18 project upwardly into the head 17 to guide the block 18 for linear up and down movement. As shown in FIG. 3B, the position of block 18 is controlled with a double acting hydraulic cylinder 23 having a piston 24 and a piston rod 26. The lower end of the piston rod 26 is secured to a center portion of the block 18.

Cutting power or voltage is supplied to the electrode 21 from a DC power supply 27 electrically connected to a line 28 leading to the electrode. The electrical circuit to the power supply 27 is completed through the cutting gap 29 between the lower end of the electrode 21 and the grounded work piece 16. The gap 29 is adjusted to provide a maximum cutting efficiency by the control system of the device 10, hereinafter described in detail.

Hydraulic fluid under pressure is applied to the cylinder 23 through a single hydraulic fluid supply line 31 leading to a first line 32 for directing the fluid to the lower or rod end of the cylinder. A second line connected to line 33 directs hydraulic fluid to the upper or piston end of the cylinder 23. A control valve, indicated generally at 34, is interposed in line 33 connecting line 33a with a fluid return line 36.

As shown in FIG. 2, control valve 34 comprises a housing 37 carrying movable spool or cylindrical member 38 slidably positioned in a ported sleeve 39. Spool 38 has an annular central recess 41 providing a communicating passageway between the ports in the sleeve 39. Opposite portions of the spool 39 have V-shaped slots 42 for restricting the flow of hydraulic fluid to the inlet and outlet ports of the valve. Slots 42 are progressively wider and deeper in an axial direction toward the recess 41. A spring 43 acting on the spool 38 biases the spool to a central closed position toward an electric motor or solenoid 44 operable to axially move the spool to control the flow of hydraulic fluid to the cylinder 23. Solenoid 44 has a movable axial core connected to the end of spool 38.

As shown in FIG. 3B, the spool member 38 has five operating positions. The first position 46 permits the flow of fluid from line 33a into line 36 and blocks the return flow of fluid from the lower end of cylinder 23. In this manner, the cylinder piston 24 will move upwardly in the cylinder carrying the electrode 21 away from the work piece 16. In position 47, a restricted flow of fluid is allowed between line 33a and return line 36. This moves the piston 23 upwardly at a relatively slow and controlled rate. Closed position 48 blocks the flow of fluid through the lines 33, 33a and 36. Position 49 permits a restricted flow of fluid through the valve 34 from the line 33 to the line 33a. In this manner, the piston 24 is moved downwardly at a controlled rate as the area of the top of the piston is greater than the area at rod side of the piston. The effective area is that of the piston rod 26. When the spool member 38 is in position 49, the movement of piston 24 is in a regenerative hydraulic circuit and servo controlled in response to electrode gap 29 condition as hereinafter described in detail. In position 50, unrestricted flow of fluid is allowed through line 33 whereby the piston 24 moves in rapid motion downwardly, as the piston 24 is in a straight regenerative hydraulic circuit, carrying the electrode 21 toward the work piece 16. Positions 47, 48, and 49 are the servo working range 51 of the control valve 34 under the control of the servo solenoid 44.

The servo solenoid 44 is electrically controlled with a Triac controller 52 connected through a variable resistor unit 53 to a light sensitive means 54, as a photocell, light sensitive resistor and the like. The light sensitive means 54 functions to vary the output signal of the Triac controller 52 and thereby control the power delivered to the servo solenoid 44. The light sensitive element 54 is aligned with a light 56, as a neon lamp, connected to the power line 28. The light sensitive element 54 and light 56 can be single assembly or optoelectronic device. The light 56 is connected in parallel with the circuit for the electrode 21 so that when the electrode is spaced from the work piece 16 the light 56 will have its greatest intensity. The variable resistor element 53 is adjusted to provide a control for the action of the servo solenoid 44. This adjustment is used to control the cutting gap 29. As the cutting gap 29 becomes smaller, the power supplied to the light 56 will be decreased. This decrease in light intensity is sensed by the light sensitive element 54 to produce a change in the signals supplied to the servo solenoid 44.

As shown in FIG. 2, a manual control means, indicated generally at 58, is operative to override the operation of the solenoid 44 to move the spool 38 of the control valve 34. The manual control means 58 comprises a rack 59 positioned on an outwardly directed rod 61 secured to the movable core of the solenoid 44. Coil springs 62 located on opposite sides of the rack 59 yieldably position the rack on the rod 61 so that the solenoid 44 can operate independently of the manual control means. Located in driving engagement with the teeth of rack 59 is a segment gear 63 secured to an end of a lever 64 mounted on a housing 67 with a pivot 66. Lever 64 moves between up and down positions to control the movement of the spool 38. The lever 64 projects outwardly through an upright slot 68 in the front control panel 69. As shown in FIG. 3B, the lever 64 is moved into a down position, as shown in broken lines, to position the spool 38 to permit the flow of hydraulic fluid to the top of cylinder 23. This moves the electrode 21 down toward the work piece 16. The lever 64 is also movable to an up position to position the spool 38 to connect line 33a with the return line 36. The fluid in line 31 will be supplied through line 32 to the bottom of cylinder 23 and thereby raising the electrode 21 relative to the work piece 16. When the lever 64 is up the electrode 21 moves up and when the lever 64 is down the electrode moves down.

The hydraulic cylinder 23 can be locked in any position with a lock valve 71 located in line 32. Valve 71 is a two-position, open and closed valve operated with a lock solenoid 72. A light 73 connected in parallel with the solenoid is operative to show that the valve 71 is in the manually locked position. A manually operated switch 74 is interposed in electric line 76 connecting the lock solenoid 72 to the electrode 21. Switch 74 is operative to ground the solenoid and thereby manually lock the hydraulic cylinder 23 in any desired position. The electric power source 77 for the lock solenoid 72 is connected to a first normally closed switch 78 and a second single pole, double contact switch 79 connected in series in a line 81 leading from the power source 77 to the solenoid 72. Switch 79 is normally in the position closing the line 81 so that the power is directed to the lock control circuit. On the lowering of the electrode 21 toward the work piece 16, the lock solenoid will be actuated as soon as the electrode makes contact with the work piece 16 completing the electric circuit. At that time, the locked solenoid will operate the valve 71 and prevent further movement of the electrode 21. At the same time, a light 103 will be ON to indicate that the cylinder 23 is in the locked position. The valve 71 will remain in the locked position as long as the switches 78 and 79 are closed.

As shown in FIGS. 1, 3B and 4, the switches 78 and 79 are located on the back of the front panel 69 adjacent the upright slot 68. Switch 78 has an actuator finger 78A extended across the upper pathway of the lever 64. Switch 79 has an actuator 79A extended downwardly adjacent to a lateral recess 82 open to the slot 68. The lateral recess 82 opens to the mid-section of the slot 68 whereby the spool 38 is located in the servo working range 51. The servo solenoid 44 has a minimum resistance to the spring 62 coupling the rack 59 with the rod 61 when lever 64 is in recess 82.

Switch 79 is also connected to a power supply relay 98 across floatswitch contact 97 (FIG. 4) and closed contacts 83C of control relay 83. Switch 79 is actuated by moving the lever 64 into the lateral recess 82 to trigger the power supply relay 98 to provide the cutting power to the electrode 21. When lever 64 is moved from recess 82, the power to electrode is cut off. The switch 79 controls the power relay 98 so that all cutting voltages are removed from the electrode 21 except when actual cutting is occurring.

Referring to FIGS. 1, 3B and 4, there is shown a depth control apparatus, indicated generally at 86, operable to terminate the power supplied to the electrode 21 after a predetermined depth has been cut into the work piece 16. The depth control apparatus 86 comprises a support 87 secured to a movable portion of the block 18 so that the support 87 moves with the electrode 21. Support 87 may be attached to one of the guide rods 22 extended upwardly into the upper frame 17 of the machining device. Secured to the upper end of support 87 is a top contact block 88 connected with a line 89 to the control relay 83. When the electrical circuit to contact block 88 is complete, the relay 83 is operable and through its own contact 83C terminates the current to relay 98 and power supply to the electrode 21. Mounted on the lower portion of support 87 is a dial indicator 91 having an upwardly movable actuating rod 92 in alignment with the top contact block 88 and a ground contact block 93. Panel 69 has an upright slot 94 for accommodating and guiding the ground contact block 93. The ground contact block 93 is located relative to electrode holding block 18 adjustably secured to the front panel 69 whereby the depth of the cut of the electrode 21 may be adjusted by changing the vertical position of the ground contact block 93 on the front panel 69. The contact block 93 is adjusted after the electrode 21 has been moved into contact with the top of the work piece 16. As previously described, when the electrode 21 moves downwardly into physical contact with the work piece 16 the lock solenoid 72 circuit is electrically actuated with the parallel connected indicating light 103 whereby the lock valve 71 traps the hydraulic fluid in the cylinder 23 to prevent a movement of the electrode 21.

As shown in FIG. 4, when the actuating rod 92 engages the contact block 88 the circuit through the control relay 83 is complete thereby closing the relay contacts 83A and 83B. Contacts 83A bypass the depth control apparatus to maintain imposed condition. Contacts 83B energize an indicator light 96 which tells the operator that the finished depth has been reached. The holding or imposed condition of control relay 83 is disengaged by moving lever arm 64 out of recess 82 thus deactivating switch 79 and that part of the circuit arrangement which pertains to the automatically controlled features.

The control relay 83 has the normally closed contacts 83C connected to a float controlled switch 97 operative in response to the level of the dielectric liquid 14 in the tank 13 as safety and check before current would pass into power-on relay 98. When the level of the liquid 14 is above a predetermined level, the switch 97 connects power-on relay 98 engaging cutting power to the electrode 21. A light 99 connected in parallel with the relay 98 indicates when the relay 98 is in the ON position. When the level of the liquid 14 is low, the float controlled switch 97 disconnects power relay 98 and power to electrode 21, but connects the current to a second relay 101 and an indicator light 102. Relay 101 has contacts 101A which bypass the switches 78 and 79 connecting the lock solenoid 72 to the power source 77. Normally closed contacts 101B are connected in the line with light 103 so that light 103 will be OFF when relay 101 is activated. The relay 101 has additional contacts 101C which will close and connect solenoid 72 to ground and thereby energize solenoid 72 moving the valve 71 to the closed position. In case of failure of dielectric fluid supply, power will be turned off but with the electrode maintained at cutting position by the lock valve 71. Cutting action resumes when dielectric level is restored to safe level.

Referring to FIGS. 2 and 3A, there is shown the hydraulic fluid supply apparatus, indicated generally at 104, for providing a continuous supply of hydraulic fluid, as oil, under pressure to the hydraulic fluid supply line 31 and provide a chamber for return fluid from the return line 36. The apparatus 104 has a common support or base 106 carrying a first upright cylinder 107 having a chamber 108 for storing hydraulic fluid 109. Located adjacent to cylinder 107 is a second upright hydraulic cylinder 111 having a fluid storing chamber 112. A common flat top or lid 115 secured to the cylinders 107 and 111 closes the tops of the chambers 108 and 112. The base 106 provides a common support for the control valve 34, the solenoid 44, as well as the pivot frame 67 for the lever 64. Located below base 106 and secured to the side of the control valve 34 is a two-position switching valve 113 connected with a line 114 to the bottom of chamber 108 and a line 116 to the bottom of chamber 112. The valve 113 is movable in a first position as shown by the parallel arrows to supply fluid to line 31 and direct the return fluid from line 36 to the chamber 112. The valve has a second position, as indicated by the cross arrows, to direct the return fluid from line 36 into the chamber 109 and feed hydraulic fluid under pressure from chamber 109 into the supply line 31. The valve 113 is operated by a pair of pilot cylinders 117 and 119. A line 118 connects the cylinder 117 to the bottom of chamber 109. In a similar manner, a line 121 connects the cylinder 119 to the bottom of chamber 112. The pressure of the fluid 109 in the chambers actuates the cylinders to change the operating positions of the valve 113.

As shown in FIG. 3A, the pressure on the fluid 109 in chamber 108 has actuated cylinder 117 to position the valve 113 as indicated by the parallel arrows. The pilot cylinders 117 and 118, being responsive to the pressure of fluid 109 in the chambers 108 and 112, automatically switch the valve 113 to a position wherein the hydraulic fluid under pressure is always supplied to the supply line 31 and connects the return line 36 to the chamber for receiving the hydraulic fluid.

The pressure of the hydraulic fluid in the chambers is selectively established by the operation of a two-position valve 122 for directing a supply of air 123 selectively to lines 124 and 126 connected to the top portions of the chambers 109 and 112 respectively. The valve 122 is controlled by a solenoid 127 and spring 128. As shown by the parallel arrows, when the solenoid is energized the air under pressure is supplied to the top of chamber 108. Chamber 112 is exhausted to the atmosphere. When the solenoid 127 is de-energized, the spring 128 moves the valve 122 to second position shown by the cross arrows to direct the air under pressure to the chamber 112. The chamber 108 is exhausted to the atmosphere.

The solenoid 127 is selectively energized in response to the level of the hydraulic fluid 109 in the chamber 108. A level control mechanism comprises an upper level switch 129 and a lower level switch 131 positioned in a centrally located tube 132. The switches 129 and 131 are actuated in response to a magnetic force carried in a float 133 positioned about the tube 131. As shown in FIG. 5, float 133 encapsulates a permanent sleeve magnetic 134 operable to magnetically actuate the switches 129 and 131. The switch 131 has an overlapped wires, leaf springs or reeds contacts 136 and 137 confined within an enclosure, as a glass tube. Switch 129 is of similar construction. The switch 129, normally open, is closed by the magnetic force of the magnet 134 when the float 133 is raised to the top of chamber 108. Switch 131 is normally closed. As shown in FIG. 5, the magnet 134 opens switch 131 by spreading the contacts 136 and 137.

The switch 129 is connected in a power line 138 leading to solenoid 127. A relay 139 connected in a line between switch 129 and solenoid 127 is connected to ground by a line 141 and the normally closed switch 131. Relay 38 has a pair of holding contacts 139A connected in parallel with the switch 129 so that when the level of the liquid 109 in the chamber 108 drops below the switch 129, the solenoid 127 will remain energized until the float 133 moves downwardly along the tube 132 to actuate the lower switch 131. When switch 131 is actuated, the relay opens the contacts 139A thereby de-energizing the solenoid 127. The spring 128 will move the valve 122 to its second position to supply air under pressure to the top of the chamber 112. At this time, the liquid level in chamber 112 is close to the top, as the return liquid from line 36 has been directed by the valve 113 into the chamber 112. The application of air pressure on the liquid 109 in chamber 112 will actuate the pilot cylinder 119 so that the hydraulic fluid under pressure in chamber 112 is directed into the supply line 31.

The hydraulic fluid supply apparatus 104 provides a constant supply of hydraulic fluid under pressure to the supply line with a minimum transfer of fluid. The level switches 129 and 131, operating in conjunction with the float 133 and magnet 134, automatically operate both the air supply valve 122 and the switching valve 113.

The above description is directed to a preferred embodiment of the electrical discharge machining device of the invention. Changes in materials, size of parts, mechanical valves and linkages, and electrical parts may be made without departing from the invention.

The embodiments of the invention in which an exclusive property or privilege is claimed are defined as follows:

1. An apparatus for supplying a substantially continuous source of hydraulic fluid under pressure to a hydraulic fluid receiving means comprising: first means having a first hydraulic fluid storing chamber, second means having a second hydraulic fluid storage chamber, first valve means connected to said first chamber and said second chamber and adapted to be connected to a first fluid under pressure, said first valve means having a first position to direct the first fluid to the first chamber and exhaust the first fluid from the second chamber and a second position to exhaust the first fluid from the first chamber and to direct the first fluid to the second chamber, first control means operable to selectively locate the first valve means in the first position and second position, second valve means connected to said first chamber and said second chamber and adapted to be connected to said receiving means, said second valve means having a first position to direct pressurized hydraulic fluid from the first chamber to the receiving means and to direct hydraulic fluid from the receiving means to the second chamber and a second position to direct hydraulic fluid from the second chamber to the receiving means and to direct pressurized hydraulic fluid from the receiving means to the first chamber, and second control means to operate the second valve means, said second control means comprising pilot means connected to said first chamber and said second chamber operable to actuate the second valve means in response to the pressures of hydraulic fluid in the first chamber and second chamber.

2. The apparatus of claim 1 including: a base member supporting the first means and second means.

3. The apparatus of claim 1 wherein: the first control means includes a solenoid to operate the first valve means, a pair of switches located adjacent upper and lower portions of one of the chambers and connected to the solenoid, float means in said one chamber for actuating said switches in response to the level of hydraulic fluid in said one chamber, said upper switch operable to actuate the solenoid to locate the first valve means in its first position whereby the first fluid is supplied to the first chamber, said lower switch operable to actuate the solenoid to locate the first valve means in its second position whereby the first fluid is exhausted from the first chamber.

4. The apparatus of claim 1 wherein: the pilot means includes a first pilot cylinder connected to the first chamber and a second pilot cylinder connected to the second chamber, said pilot cylinders operable to actuate the second valve means in response to the application of pressure to either pilot cylinder.

5. The apparatus of claim 1 wherein: the first control means includes switch means in response to the level of hydraulic fluid in at least one chamber to selectively operate the first valve means.

6. The apparatus of claim 1 wherein: the first control means includes means responsive to the level of hydraulic fluid in at least one chamber to selectively operate the first valve means.

7. The apparatus of claim 1 wherein: the first valve means is connected to upper portions of said first chamber and connected to upper portions of said second chamber.

8. The apparatus of claim 1 wherein: the second valve means is connected to lower portions of said first chamber and to lower portions of said second chamber.

9. The apparatus of claim 1 wherein: the first means is an upright cylinder and the second means is an upright cylinder.

10. The apparatus of claim 9 wherein: both upright cylin-ders are mounted on a common support.

* * * * *